March 16, 1948.          C. H. HAVILL                2,437,954
                    ACCESSORY DRIVE CONTROL
                    Filed Jan. 30, 1943         2 Sheets-Sheet 2
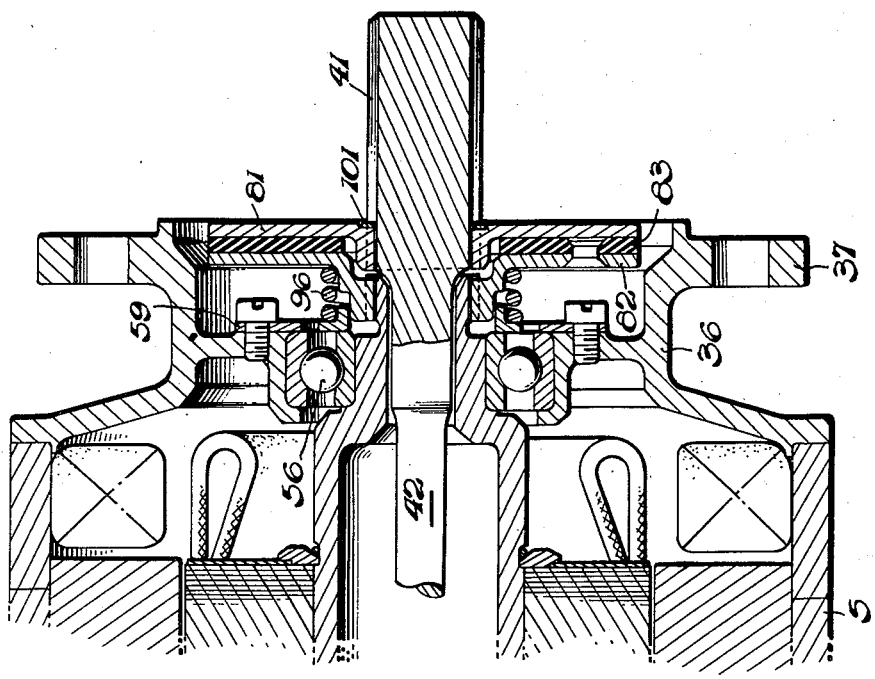
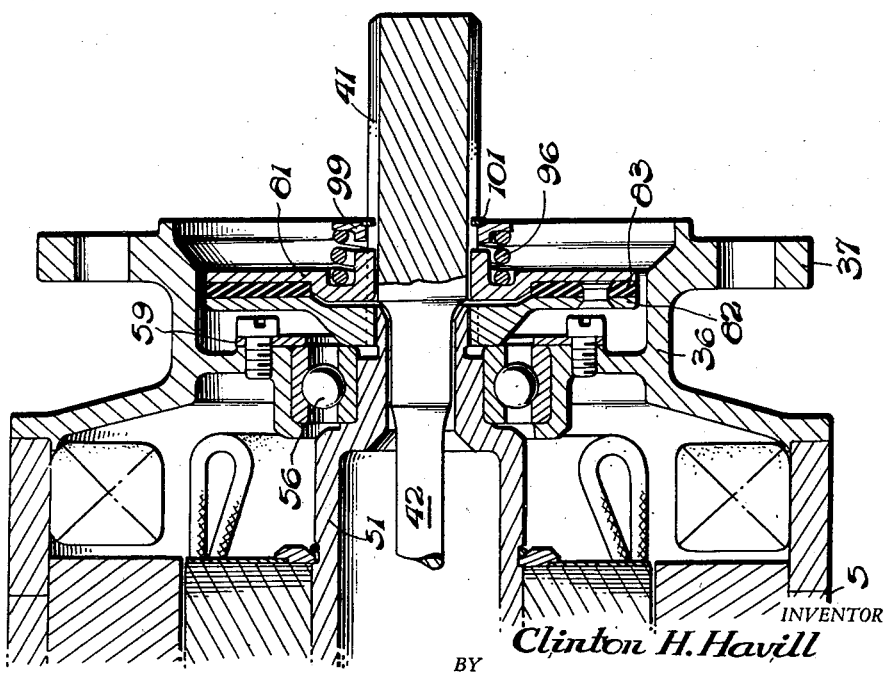
INVENTOR
Clinton H. Havill
BY
Martin J. Finnegan ATTORNEY Patented Mar. 16, 1948

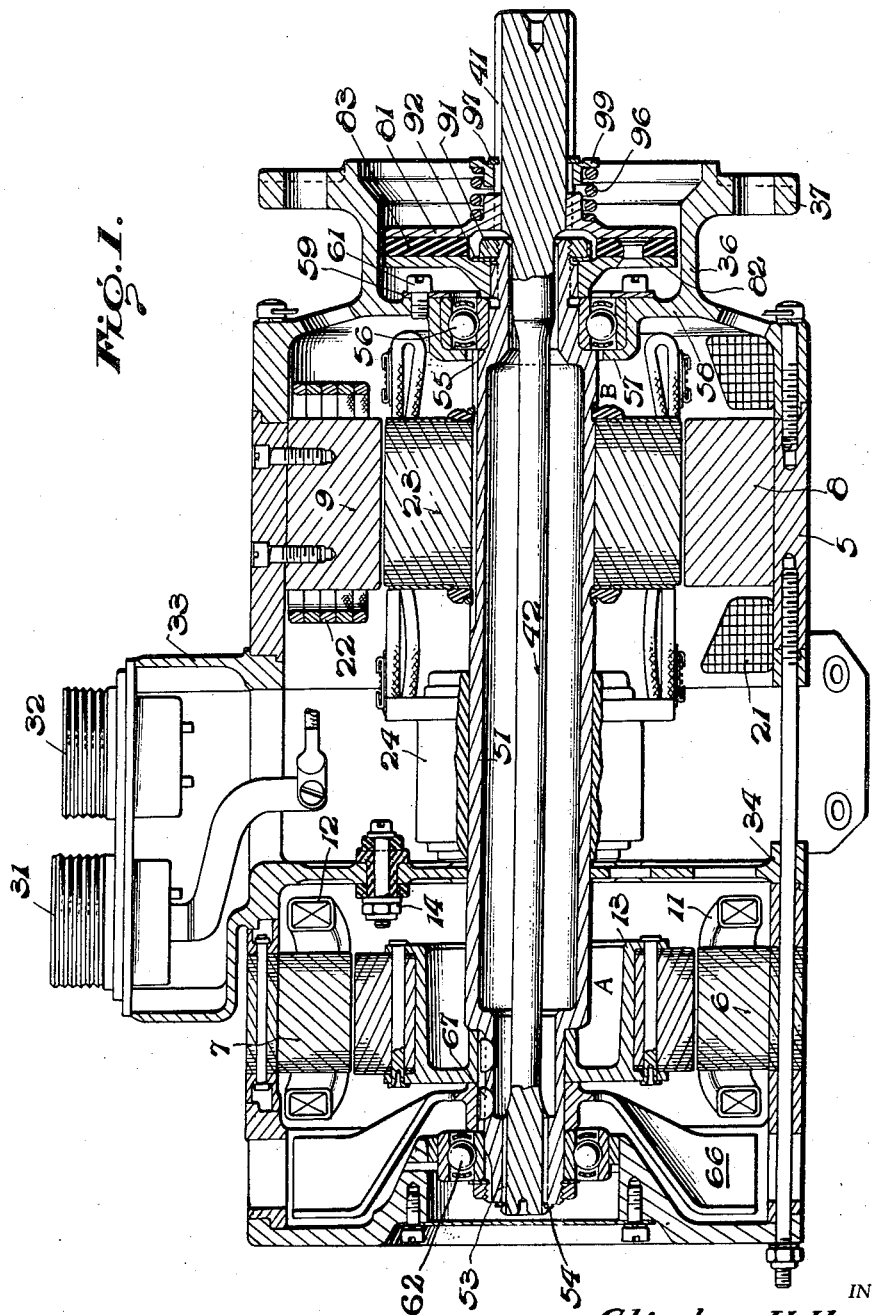

2,437,954

UNITED STATES PATENT OFFICE 2,437,954

ACCESSORY DRIVE CONTROL

Clinton Hunter Havill, South Orange, N. J., assignor to Bendix Aviation Corporation, Bendix, N. J., a corporation of Delaware Application January 30, 1943, Serial No. 474,163

3 Claims. (Cl. 74—574)

This invention relates to accessory apparatus and particularly to accessory apparatus of the type that is mechanically driven from a non-steady source of power, as, for example, an internal combustion engine.

Objects of the invention are to provide improved methods of and means for transmitting and controlling the transmission of energy from a driving source of power, for the purpose of achieving a steadier power input into the accessory, and at the same time minimizing the shock effect and fracture hazards that attend fluctuation in the turning effort applied from the driving source.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 1 is a longitudinal sectional view of a device embodying the invention; and Figs. 2 and 3 are sectional views of alternative embodiments.

Referring first to Fig. 1, there is disclosed therein a generator having a sectional housing 5 adapted to receive field poles 6, 7, 8 and 9, of which as shown, the field poles 6 and 7 in turn receive windings 11 and 12, respectively, adapted to cooperate with an inductor type annular rotor 13 and to supply alternating current to terminal screws 14, while the field poles 8 and 9 receive field windings 21 and 22, respectively, for cooperation with an armature winding on the armature 23, which armature winding supplies current to certain of the terminal screws 14 which have brush connections (not shown) to a commutator 24; the terminal screws 14 and commutator 24 being disposed in adjacent relationship and in approximate alignment with conductor outlet fixtures 31 and 32, respectively, said fixtures being mounted in a projecting portion 33 of an intermediate section 34 of the housing 5. The housing 5 is also shown as provided with a reduced section 36 and a flanged portion 37 having a series of holes provided therein whereby the unit may be attached to a suitable mounting surface on the housing of the internal combustion engine or other prime mover which is to drive the generator, by suitable connections (not shown) for imparting rotation to the splined end 41 of the inner shaft 42 of the generator. The rotor 13 and the armature 23 are interlocked with a hollow shaft 51 which surrounds the inner shaft 42 and is splined thereto at one end, as indicated at 53. A lock ring 54 holds shaft 51 against displacement, axially, in one direction, while the shoulder 55 on the shaft 51, by virtue of its engagement with the inner race of ball bearing assembly 56, prevents axial displacement of the shaft 51 in the opposite direction. The bearing assembly 56 is in turn held in position by the conjoint action of the inwardly turned portion 57 of the transverse wall 58 of the housing and the retainer plate 59 which is secured to the said transverse wall 58 by suitable means 61. A second bearing assembly 62 is provided at the opposite end of the shaft 51 at a point just beyond the location of the cooling fan 66, whose hub is keyed to the shaft 51, as indicated at 67.

The novel transmission and transmission control means of the present invention comprise, in cooperation with the inner and outer shafts 42 and 51, a yielding driving assembly including a driving plate 81, a driven plate 82, and an intermediate friction surfaced element 83 of suitable frictional torque transmitting material, the said member 83 being shown as being riveted to the driven plate 82 but in such manner that no surface of the rivets is in contact with the driving plate 81. The latter is splined to the shaft 41 while the driven plate 82 is splined to the reduced end portion of the shaft 51 and is held in position thereon by the provision of a lock nut 91 and a lock washer 92 having threaded engagement with the threaded end of the shaft 51. A coiled compression spring 96 surrounds the hub of the driving plate 81 and is locked in its adjusted position by lock ring 97 secured to the splines 41 to the rear of the spring abutment plate 99.

In operation, the turning effort applied to the splined end 41 of the inner shaft 42 causes transmission of torque to the rotating elements of the generator over two parallel paths—one path being positive and involving the inner shaft 42 to the splines 53 and from said splines to the outer shaft 51, while the simultaneously effective but yieldable parallel path is constituted by the clutch assembly 81—83—82, and this latter path will operate to minimize the harmful effects of those torque impulses which are created by reason of the non-steady nature of the power development in the driving prime mover. Because of this action of the parallel path constituted by the elements 81—83—82, the generator parts, and particularly the slender inner shaft 42 as well as the comparatively thin-walled outer shaft 51, are protected against the necessity of absorbing the objectionable non-steady components of the driving torque. Moreover, the parallel path 81—83—82 operates to dampen large amplitudes of the oscillating system constituted by shafts 42 and 51 and the rotor assembly mounted thereon, when the said system is operating at resonant frequencies. It is well to note that as the parallel path 81—83—82 is a frictional path, it has no natural period of vibration, while path 41—42—51, on the other hand, has a definite natural frequency. The conjoint operation of both of these in parallel, therefore, serves to dampen resonate oscillation over the entire range of frequencies encountered in the widely variable speed service to which engine accessories are applied. Hence the rotor assembly may resonate without damage to the component parts such as might result if large amplitudes were created. In other words, the amplitude of vibration of the rotating assembly is prevented from rising beyond a safe maximum, which maximum may be controlled by suitable choice of damping means, within the present teaching, and by suitable adjustment of the loading of spring 96 (or any equivalent thereof which may be substituted therefor).

Upon examination of the foregoing it will be apparent to those skilled in the art that the novel torque transmitting and transmission control method above described, with particular reference to Fig. 1, can be practiced by the use of constructions differing in form from that specifically illustrated in Fig. 1. One such alternative construction is shown in Fig. 2 and another in Fig. 3, in both of which figures parts corresponding to those of Fig. 1 are designated by similar reference characters. In Fig. 2 the driven plate is shown as being capable of limited axial play with respect to the splined end of the outer shaft 51, rather than being locked against such axial play as in Fig. 1, while in Fig. 3 there is substituted for the spring abutment 99 of Figs. 1 and 2, a different arrangement in which the spring 96 is interposed between the driven plate 82 and the bearing retaining plate 59, while the driving plate 81 of the clutch is locked against displacement in one direction by a lock ring 101. In each embodiment, however, the clutch assembly 81—83—82 operates as a parallel path of torque transmission and vibration damping substantially as in the arrangement of Fig. 1.

The shaft 51, although illustrated as being of one piece, is in practice formed of three pieces welded together at the points indicated by reference letters A and B in Fig. 1.

What is claimed is:

1. In a machine adapted to be rigidly mounted on and driven from a pulsating power source, a hollow cylindrical housing, a rotor rigidly mounted on a stiff tube, end bearings for said tube and supporting said rotor in said housing, a resilient drive shaft extending longitudinally in said tube and in spaced relation thereto, one end of said shaft being connected with one end of said tube and the other end of said shaft extending from the other end of said tube for an external driving connection, a constricted portion of said housing forming a shield at said other end of the tube, the other end of said tube extending through one of said end bearings and into said end shield, a plate positioned within said end shield, a splined connection drivingly connecting said plate to said tube and permitting longitudinal movement of said plate on said tube, a second plate positioned within said end shield and mounted on said shaft, a coil spring encircling said tube and positioned between said one end bearing and said first mentioned plate to bias the first plate toward the second plate so as to maintain a frictional driving relation between said plates, and said plates cooperating with said constricted portion of said housing in shielding said coil spring.

2. In a machine adapted to be rigidly mounted on and driven from a pulsating power source, a hollow cylindrical housing, a rotor rigidly mounted on a stiff tube, end bearings for said tube and supporting said rotor in said housing, a resilient drive shaft extending longitudinally in said tube and in spaced relation thereto, one end of said shaft being drivingly connected to and within one end of said tube and the other end of said shaft extending from the other end of said tube for an external driving connection, a constricted portion of said housing forming a shield at said other end of the tube, the other end of said tube extending through one of said end bearings and into said end shield, first and second plates positioned within said end shield, means drivingly connecting the first plate to said shaft, other means drivingly connecting the second plate to said tube, a coil spring encircling said shaft to bias one of said plates toward the other plate, one of said connecting means including a spline connection for permitting longitudinal movement of said one plate relative to the other plate under the biasing force of said coil spring so as to maintain a frictional driving relation between said plates to dampen torsional and lateral vibrations of said shaft, and said plates cooperating with said constricted portion of said housing in shielding said one end bearing.

3. In a machine adapted to be rigidly mounted on and driven from a pulsating power source, a housing, a rotor rigidly mounted on a stiff tube, end bearings for said tube and supporting said rotor in said housing, a resilient drive shaft extending longitudinally in said tube and in spaced relation thereto, one end of said shaft being drivingly connected to and within one end of said tube and the other end of said shaft extending from the other end of said tube for an external driving connection, a constricted portion of said housing forming a shield at said other end of the tube, the other end of said tube extending through one of said end bearings and into said end shield, first and second plates positioned within said end shield, means drivingly connecting the first plate to said shaft, other means drivingly connecting the second plate to said tube, a coil spring encircling a portion of said shaft and arranged to bias one of said plates toward the other plate so as to maintain a frictional driving relation between said plates to dampen torsional and lateral vibrations of said shaft, and said plates cooperating with said constricted portion of said housing in shielding said one end bearing.

CLINTON HUNTER HAVILL.

REFERENCES CITED

The following references are of record in the file of this patent:

UNITED STATES PATENTS

| Number | Name | Date |
| --- | --- | --- |
| 1,381,687 | White | June 14, 1921 |
| 1,716,284 | Risley | June 4, 1929 |
| 1,830,600 | Fifield | Nov. 3, 1931 |
| 1,965,742 | Junkers | July 10, 1934 |
| 1,978,922 | Wemp | Oct. 30, 1934 |
| 2,220,751 | Bergman | Nov. 5, 1940 |
| 2,346,432 | Heintz | Apr. 11, 1944 |

FOREIGN PATENTS

| Number | Country | Date |
| --- | --- | --- |
| 274,975 | Italy | June 17, 1930 |
| 405,813 | Great Britain | Feb. 15, 1934 |